Dec. 12, 1950  E. E. GILBERT  2,533,884
2,4-DICHLOROPHENOXYACETIC ACID COMPOSITIONS
Filed Feb. 1, 1949
FIG. I.
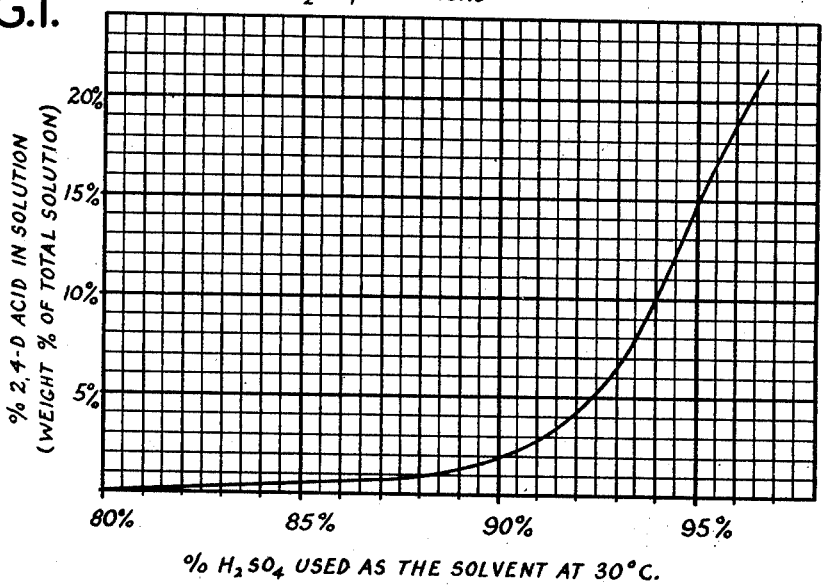
SOLUBILITY OF 2,4 DICHLOROPHENOXYACETIC ACID IN $H_2SO_4$ SOLUTIONS
% $H_2SO_4$ USED AS THE SOLVENT AT 30°C.
FIG. 2.
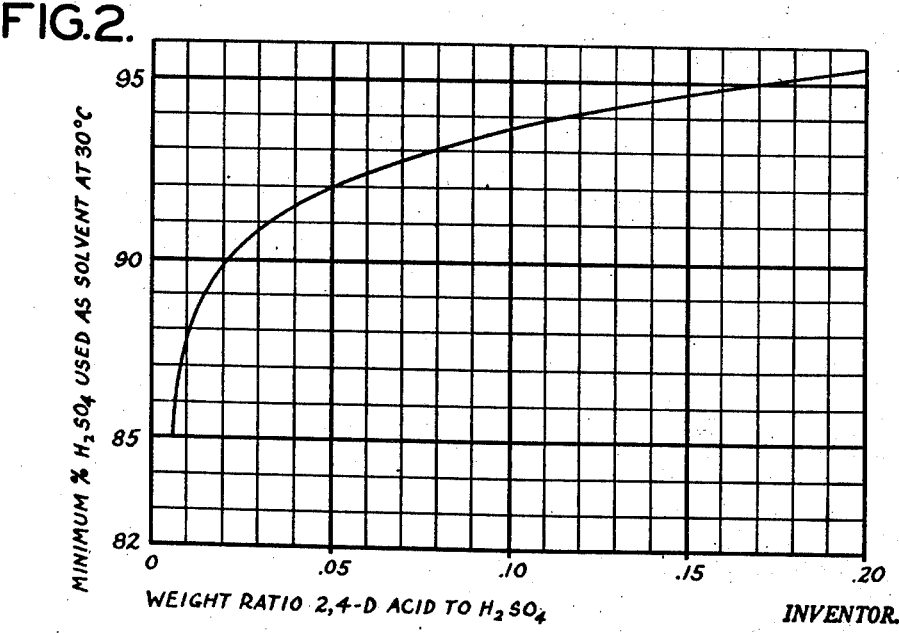
MINIMUM $H_2SO_4$ CONCENTRATION OF SOLVENT REQUIRED TO FORM CONCENTRATE SOLUTION OF GIVEN RATIO OF 2,4-D ACID TO $H_2SO_4$
INVENTOR.
EVERETT E. GILBERT
BY Joseph A. Ryan
ATTORNEY.

Patented Dec. 12, 1950

2,533,884

UNITED STATES PATENT OFFICE 2,533,884

2,4-DICHLOROPHENOXYACETIC ACID COMPOSITIONS

Everett E. Gilbert, New York, N. Y., assignor to Allied Chemical & Dye Corporation, New York, N. Y., a corporation of New York Application February 1, 1949, Serial No. 73,986

8 Claims. (Cl. 71—2.4)

This invention relates to herbicidal compositions comprising 2,4-dichlorophenoxyacetic acid.

In the past 2,4-dichlorophenoxyacetic acid (hereinafter referred to, for the purpose of brevity, as "2,4-D acid") has been used as a herbicide in the form of a water solution of its sodium salt or its amine salt. It would be desirable, if practical, to utilize 2,4-D acid as such as a herbicide. However, the application of the free acid has been quite difficult due to its very low solubility in water and aqueous media (far less than 0.1% by weight) and in inexpensive organic solvents and mineral oils. There are serious practical difficulties in employing mechanical mixing to disperse 2,4-D acid in spray liquids in which the acid is insoluble. On the other hand, if a solution of the sodium salt is acidified and the 2,4-D acid thereby precipitated from the solution relatively large crystals of the precipitated acid are obtained. Such crystals do not have the fineness desired of a herbicide and are not suitable for spraying. Further, the operation of dissolving solid sodium salt in water to form spray solutions is cumbersome and difficult to carry out in commercial operation in the field.

In order to increase the solubility of this herbicide in inexpensive organic solvents and mineral oils, the use of co-solvents such as tributyl phosphate has been proposed. However, only limited solubility increase may be obtained thereby, and, further, this method is impractical for large scale commercial use due to the high cost of the co-solvents employed.

The action of 2,4-D acid in killing weeds is relatively delayed whereas the action of sulfuric acid, a known weed killer, is very rapid. On the other hand, the sulfuric acid is easily leached from the soil and its herbicidal action is thereby lost, whereas 2,4-D acid, being highly insoluble in water, remains in the soil a relatively long time and its herbicidal effect is retained. The combination of 2,4-D acid and sulfuric acid in one herbicidal composition, therefore, would have the combined desirable properties of quick kill and long lasting inhibitive effect on re-growth.

One object of my invention is to produce a homogeneous solution of 2,4-D acid in a solvent, which solution may be used advantageously in making herbicide spray mixtures. A further object is to produce a dispersion of 2,4-D acid in liquid medium, such as aqueous sulfuric acid solution, which is suitable for direct use as a herbicide spray. Other objects will appear hereinafter.

I have discovered that, in contrast with the very low solubility in aqueous media and common organic solvents and mineral oils, 2,4-D acid may be dissolved in sulfuric acid having an $H_2SO_4$ strength of about 83% or above to produce solutions having substantial dissolved content of 2,4-D acid, i. e. about 0.2% by weight and above. Based on this discovery, one embodiment of my invention comprises formation of liquid compositions comprising 2,4-D as solute in solution in strong sulfuric acid as solvent, which solvent has $H_2SO_4$ strength not less than about 83% by weight, the concentration of the 2,4-D solute being not less than about 0.2% by weight based on the solute plus solvent. Said strong sulfuric acid solvent may suitably be an $H_2SO_4$-$H_2O$ phase having an $H_2SO_4$-$H_2O$ content equivalent to that of the indicated sulfuric acid strengths.

Figure 1 represents the relation between solubility of 2,4-D acid in strong sulfuric acid and $H_2SO_4$ content of said sulfuric acid at 30° C. It will be noted that, as $H_2SO_4$ content of the solvent is increased, greater amounts of 2,4-D acid solute are soluble therein, e. g. about 0.5% 2,4-D acid is soluble in sulfuric acid of 85% $H_2SO_4$ strength. Sulfuric acid solvent concentrations as high as about 97% by weight $H_2SO_4$ and above, may be employed in making solutions of 2,4-D acid in concentrated sulfuric acid. Accordingly, in its broader aspects, my invention contemplates 97% $H_2SO_4$ and above as solvent. In the high concentration of $H_2SO_4$ however, sulfuric acid may tend to cause noticeable decomposition of the organic solute, and, accordingly, I prefer concentrate solutions having solvent $H_2SO_4$ strengths not substantially above 97% by weight. As much as approximately 22% 2,4-D acid may be dissolved in sulfuric acid of about 97% $H_2SO_4$ content. Accordingly, a preferred embodiment of my invention includes such a liquid composition in which the $H_2SO_4$ content of the sulfuric acid solvent is greater than about 85% by weight and the 2,4-D solute content is substantially in the range 0.5%–22% by weight based on solute plus solvent. A further preferred embodiment includes such a liquid composition in which the $H_2SO_4$ content of the sulfuric acid is substantially in the range of 85–97% $H_2SO_4$ by weight and the 2,4-D solute content is not less than 0.5%, preferably substantially in the range 0.5%–22% by weight based on solute plus sulfuric acid solvent.

In accomplishing a preferred object of the invention, I have found that mixtures of 2,4-D acid and sulfuric acid may be obtained in a form suitable for direct application as herbicide to the plants or the soil, by mixing such solutions of 2,4-D acid in strong sulfuric acid with a material which is solvent for the $H_2SO_4$ and a non-solvent 2,4-D acid, such as an aqueous medium. The 2,4-D acid is thereby precipitated and becomes dispersed in the solution in an extremely finely divided flocculent form. Such disperse form system possesses enhanced herbicidal and spraying properties and accomplishes the objects previously indicated. Further, when used alone as a herbicide, sulfuric acid is known to cause deterioration of the protective tough outer coat of the weed seeds with resultant accelerated rate of water penetration into the seed and accelerated germination. By combining 2,4-D acid with $H_2SO_4$, an enhanced seed-killing action may be obtained because the 2,4-D penetrates the $H_2SO_4$-softened seed coat with rapid lethal effect. Accordingly, the solutions of 2,4-D acid in strong sulfuric acid of my invention may be advantageously employed as herbicide concentrates to be subsequently diluted to produce weed- and seed-killing spray mixtures.

In view of the inherent difference in nature of weed-killing properties in 2,4-D acid and $H_2SO_4$ mentioned above, the amounts of each of these herbicides in the spray mixture is a factor of importance in determining the plant killing properties of said mixture. Although the rate of application in pounds per acre of 2,4-D acid and $H_2SO_4$ may depend upon the type and density of vegetation to be combatted, the degree and permanency of weed kill desired, and other factors, for most uses satisfactory results may be obtained by dispersing the 2,4-D acid over the area to be treated at a rate in the range about ½ to 12 pounds per acre. Similarly, the rate of application of $H_2SO_4$ may be as low as 50 pounds per acre and below and as high as 100 pounds per acre and above, but it is usual to apply sulfuric acid at the rate of about 75 pounds per acre. Accordingly, the ratio of 2,4-D acid to 100% $H_2SO_4$ in the spray mixture is chosen to accomplish the purpose in view, but is usually in the range approximately ½ to 75 (about .006) to approximately 12 to 75 (about 0.16). Due to the combined herbicidal action of sulfuric acid and 2,4-D acid, the former contributing a quick killing action, and the latter a long lasting action inhibiting regrowth of weeds and other vegetation, my invention is particularly adapted for use on a large scale for clearing railroad tracks. In this use, 2,4-D acid may be advantageously applied at the rate of about ¾ to about 8 pounds per acre, which rate, with application of $H_2SO_4$ at 75 pounds per acre, corresponds with ratios of about 0.01 to about 0.11 pound of 2,4-D acid per pound of $H_2SO_4$.

It is a particular advantage of my invention that, in view of the unexpectedly high solubility of 2,4-D acid in strong sulfuric acid as shown in Figure 1, a concentrate solution of the former in the latter acid may be prepared which already contains the proportions of the two acids desired for the final spray mixture. To illustrate, Figure 2 represents graphically the relation between ratio of 2,4-D acid and $H_2SO_4$ desired and minimum $H_2SO_4$ concentration of the solvent at 30° C. If a solution of 2,4-D acid in strong sulfuric acid having a ratio of 2,4-D acid to $H_2SO_4$ of 0.16 is desired, this may be obtained in sulfuric acid solvent of 94.7 weight percent $H_2SO_4$ content (or greater since solubility increases with percent $H_2SO_4$), as shown on Figure 2. On the other hand, a ratio as low as 0.01 may be obtained in sulfuric acid solvent of about 88 weight percent or greater $H_2SO_4$ content as shown by Figure 2. Ratios of 0.006 and 0.11 may be obtained in solvents of $H_2SO_4$ strength of about 85% and above, and about 93.8% and above, respectively. Similarly, for higher, lower or intermediate ratios of 2,4-D acid to $H_2SO_4$, there are corresponding saturation concentrations represented on Figure 2, indicating $H_2SO_4$ concentrations at and above which suitable concentrate solutions may exist.

It will be appreciated by those skilled in the art that solubility is generally influenced by temperature and, accordingly, that the solubility of 2,4-D acid in sulfuric acid may be appreciably higher or lower than represented by Figure 1 accordingly as temperature is higher or lower than 30° C. If solubility is higher, minimum $H_2SO_4$ concentrations lower than those represented on Figure 2 may be utilized as solvent in concentrate solutions having a given ratio of 2,4-D acid to $H_2SO_4$. Accordingly, although particular embodiments of my invention are directed to certain prefered concentrations of $H_2SO_4$ as solvent, the invention in its broader scope is not limited thereto but comprises the desired amount of 2,4-D acid solute in solution in concentrated sulfuric acid solvent of $H_2SO_4$ strength sufficient to maintain in solution said 2,4-D acid.

As previously indicated, an inspection of Figure 1 demonstrates that the solubility of 2,4-D acid in sulfuric acid increases as the $H_2SO_4$ strength of the sulfuric acid increases. To facilitate the dissolving of the organic acid by the strong sulfuric acid and to minimize any possible incipient precipitation of the organic acid from the solution during storage or transportation (for example, due to change in solubility caused by temperature variations) it is preferred to employ a sulfuric acid solvent concentration which is slightly greater than the minimum required for total solution. On the other hand, in order to reduce to a minimum chemical decomposition of the 2,4-D acid in the concentrate, it is ordinarily preferred to employ a sulfuric acid solvent of a concentration that is not unduly higher than that necessary to maintain complete solution of the 2,4-D acid. In this way, the period during which the concentrate may be stored or shipped without excessive decomposition is lengthened. Accordingly, I prefer solvents of $H_2SO_4$ concentration approximately ½ to 1½% greater than saturation at 30° C., e. g. referring to Figure 1, in a solution of 4.3% 2,4-D acid in strong sulfuric acid the minimum $H_2SO_4$ concentration of solvent required is 92%, whereas I prefer concentrations in the range approximately 92½ to 93½% $H_2SO_4$.

The herbicide concentrate of my invention may be produced by adding the 2,4-D acid to the concentrated sulfuric acid while agitating the mixture at room temperature and continuing the agitation until complete solution is obtained. If desired, the 2,4-D acid may be initially dissolved in sulfuric acid of a strength higher than that finally desired for the herbicide concentrate. This will afford more rapid solution of the solute in the solvent. Thereafter, water may be added to the mixture while continuing the agitation to reduce the strength of the solvent to a value in the range ½ to 1½% greater than saturation, in accordance with preferred procedure as described above, or to other value desired. For instance, in making the solution of 4.3% 2,4-D acid previously referred to, the desired amount of organic acid may be first dissolved in 95% $H_2SO_4$, and thereafter water may be added to reduce the $H_2SO_4$ strength of the solvent to the approximate range 92½% to 93½%.

In all cases when mixing strong sulfuric acid and water, precautions are taken to remove or dissipate heat of solution and thereby prevent spattering of acid or sudden increase in pressure due to generation of steam. Such methods include adding a portion of the strong sulfuric acid to the water to produce a dilute acid solution, then incorporating the dilute solution with the main body of strong sulfuric acid. Alternatively, water addition may be made through a tube extending well below the surface of an agitated pool of strong sulfuric acid. Such procedures are well-known and are described, e. g. in Fairlie, "Sulfuric Acid Manufacture," Reinhold (1936) at page 552, and in Miles, "Manufacture of Sulfuric Acid (Contact Process)," Van Nostrand (1925) at page 281.

The herbicidal spray mixture will ordinarily be manufactured from the concentrate a short time before treatment of the vegetation. According to the particular herbicidal use, a liquid material which is a solvent for the sulfuric acid but a non-solvent for the 2,4-D acid, such as an aqueous medium, is chosen to dilute the herbicide concentrate and thereby produce a spray mixture. Water is a preferred material for dilution. The concentrate is preferably added to said material while agitating. The dilution of the sulfuric acid solvent by said material causes immediate precipitation of the 2,4-D acid to form a very finely divided flocculent dispersion of 2,4-D acid in liquid medium, as previously indicated. When aqueous medium such as water is mixed with concentrates, herbicidal spray mixtures comprising finely divided solid flocculent 2,4-D acid dispersed in aqueous solution, preferably sulfuric acid, may be obtained, said preferred mixtures having 2,4-D acid to $H_2SO_4$ ratios of the concentrates heretofore described. Aqueous media other than water, such as salt solutions, or acid or alkaline solutions which do not dissolve the 2,4-D acid may be used to dilute the concentrate solution of 2,4-D acid and thereby bring about precipitation of said acid in finely divded flocculent form. In herbicidal work, if desired, petroleum oils or petroleum oil solutions of other herbicides may be advantageously mixed with my diluted 2,4-D spray solutions, and the mixture applied to the vegetation.

Sulfuric acid is normally applied in strengths in the range of approximately 4 to 10% when used as a herbicide. The amounts of aqueous medium employed in the dilutions of the herbicidal concentrate according to this invention are preferably those that will produce final sulfuric acid concentrations within this range.

The following procedures illustrate practice of my invention, the parts and percentages being by weight:

*Example 1.*—An amount of solid 2,4-D acid in excess of saturation at 30° C. was added to and mixed with 85% sulfuric acid. The mixture was agitated at 30° C. until saturation was obtained. Excess undissolved 2,4-D acid was then removed from the solution, which contained 2,4-D acid solute in solution in sulfuric acid solvent. The solvent contained 85% $H_2SO_4$ and 15% $H_2O$, and the solution contained 0.5% 2,4-D acid based on solute plus solvent. The weight proportion of 2,4-D acid to $H_2SO_4$ in said solution was about 0.006. In this manner saturated homogeneous solutions of 2,4-D acid in strong sulfuric acid of the following compositions were obtained:

| Per cent of 2,4-D acid based on solute plus solvent | Per cent $H_2SO_4$ in the solvent | Per cent $H_2O$ in the solvent | Ratio 2,4-D acid to $H_2SO_4$ |
|---|---|---|---|
| 0.5 | 85 | 15 | 0.006 |
| 4.3 | 92 | 8 | 0.05 |
| 10.3 | 94 | 6 | 0.115 |
| 14.8 | 95 | 5 | 0.173 |
| 21.8 | 96.8 | 3.2 | --------- |

*Example 2.*—10 parts of 2,4-D acid were added to 190 parts of 96% $H_2SO_4$ sulfuric acid and the mixture agitated at about 30° C. until all of the 2,4-D acid had dissolved. The resulting mixture was a homogeneous solution containing 2,4-D acid solute dissolved in sulfuric acid solvent. The solvent contained 96% $H_2SO_4$ and 4% $H_2O$ and the solution contained 5% 2,4-D acid based on solute plus solvent. The ratio of 2,4-D to $H_2SO_4$ was about 0.055. This solution was poured into 2400 parts by weight of water while vigorously stirring said water. The mixture obtained contained solid 2,4-D acid precipitated in extremely finely divided flocculent form suspended in a solution of $H_2SO_4$ in water of about 7% strength. This mixture was suitable for direct use as a herbicide spray. Upon standing for one day, the 2,4-D acid remained suspended in the liquid in light cottony flocks.

By contrast, an amount of 2,4-D sodium salt equivalent to said 2,4-D acid, dissolved in 2400 parts of water and acidified with vigorous stirring produced a 2,4-D acid precipitate which had a noticeable crystalline structure, which crystals occupied a fraction of the apparent volume of the cottony flocks produced by addition of the 2,4-D-sulfuric acid solution to water as described above.

*Example 3.*—10 parts of 2,4-D acid were added to 920 parts of 95.5% $H_2SO_4$ sulfuric acid and the mixture was agitated at about 50° C. until complete solution was obtained. While continuing the agitation, 70 parts of water were added slowly to the mixture. This reduced the acid concentration of the solvent to about 89% $H_2SO_4$. No precipitation of 2,4-D acid solute occurred. The resulting solution containing solvent of about 89% $H_2SO_4$, 11% $H_2O$ composition, and the 2,4-D content of the solution was 1.0% based on solute plus solvent.

I claim:

1. A liquid composition of matter comprising 2,4-dichlorophenoxyacetic acid as solute in solution in strong sulfuric acid as solvent, said solvent having an $H_2SO_4$ strength not less than about 85% by weight, the concentration of said solute being not less than about 0.5% by weight based on said solute plus solvent.

2. A liquid composition of matter comprising 2,4-dichlorophenoxyacetic acid as solute in solution in an $H_2SO_4$-$H_2O$ phase, said phase having an $H_2SO_4$-$H_2O$ content equivalent to that of sulfuric acid substantially in the range of 85–97% $H_2SO_4$ strength, the concentration of said solute being substantially in the range of 0.5%–22% by weight based on said solute plus $H_2SO_4$-$H_2O$ content.

3. A liquid composition of matter, adaptable for use as a herbicidal concentrate, comprising 2,4-dichlorophenoxyacetic acid as solute in solution in strong sulfuric acid as solvent, said solvent having an $H_2SO_4$ strength not less than about 85% by weight, and the weight ratio of said solute to said $H_2SO_4$ being substantially in the range of 0.006–0.16.

4. A liquid composition of matter, adaptable for use as a herbicidal concentrate, comprising 2,4-dichlorophenoxyacetic acid as solute in solution in an $H_2SO_4$-$H_2O$ phase, said phase having an $H_2SO_4$-$H_2O$ content equivalent to that of sulfuric acid in the range of 85–97% $H_2SO_4$ strength, and the weight ratio of said solute to said $H_2SO_4$ being substantially in the range of 0.006–0.16.

5. A liquid composition of matter, adaptable for use as a herbicidal concentrate, comprising 2,4-dichlorophenoxyacetic acid as solute in solution in an $H_2SO_4$-$H_2O$ phase, said phase having an $H_2SO_4$-$H_2O$ content equivalent to that of sulfuric acid in the range of 88–97% $H_2SO_4$ strength, and the weight ratio of said solute to said $H_2SO_4$ being substantially in the range of 0.01–0.11.

6. A homogeneous solution consisting of 2,4-dichlorophenoxyacetic acid as solute in solution in an $H_2SO_4$-$H_2O$ phase, said phase having an $H_2SO_4$-$H_2O$ content equivalent to that of sulfuric acid in the range of 85–97% $H_2SO_4$ strength, and the weight ratio of said solute to said $H_2SO_4$ being substantially in the range of 0.006–0.16.

7. The method of producing 2,4-dichlorophenoxyacetic acid in finely subdivided flocculent form dispersed in liquid medium which comprises mixing a solution of 2,4-dichlorophenoxyacetic acid in strong sulfuric acid with a liquid which is a solvent for said sulfuric acid but is a non-solvent for said 2,4-dichlorophenoxyacetic acid, whereby said 2,4-dichlorophenoxyacetic acid is precipitated in a finely divided flocculent form in liquid medium.

8. A method of producing a herbicidal spray mixture which comprises dissolving 2,4-dichlorophenoxyacetic acid as solute in strong sulfuric acid of $H_2SO_4$ content substantially in the range of 88–97% $H_2SO_4$ by weight, the weight ratio of said solute to said $H_2SO_4$ in the solution so formed being in the range approximately 0.01 to approximately 0.11, and thereafter incorporating said solution with aqueous medium while agitating said aqueous medium, the amount of said medium being such that the $H_2SO_4$ concentration is reduced to the range approximately 4 to 10% by weight, thereby to obtain a herbicidal spray mixture having 2,4-dichlorophenoxyacetic acid dispersed therein in finely subdivided flocculent form.

EVERETT E. GILBERT.

REFERENCES CITED

The following references are of record in the file of this patent:

UNITED STATES PATENTS

| Number | Name | Date |
|---|---|---|
| 2,390,941 | Jones | Dec. 11, 1945 |

FOREIGN PATENTS

| Number | Country | Date |
|---|---|---|
| 574,274 | Great Britain | Dec. 31, 1945 |